United States Patent [19]

Neefe

[11] Patent Number: 4,695,399

[45] Date of Patent: * Sep. 22, 1987

[54] METHOD OF MAKING A CONTACT LENS MATERIAL WHICH MAY BE IDENTIFIED BY COLORED FLUORESCENCE

[76] Inventor: Charles W. Neefe, 811 Scurry St., P.O. Box 429, Big Spring, Tex. 79720

[*] Notice: The portion of the term of this patent subsequent to Dec. 30, 2003 has been disclaimed.

[21] Appl. No.: 913,453

[22] Filed: Sep. 30, 1986

Related U.S. Application Data

[63] Continuation-in-part of Ser. No. 857,177, Apr. 29, 1986, Pat. No. 4,632,773.

[51] Int. Cl.$^4$ .............................................. C09K 11/02
[52] U.S. Cl. ........................ 252/301.35; 252/301.16; 252/301.36; 351/160 R; 351/162; 523/106; 523/108
[58] Field of Search ...................... 252/301.36, 301.35, 252/301.16; 351/160 R; 523/106, 108

[56] References Cited

U.S. PATENT DOCUMENTS

| | | | |
|---|---|---|---|
| 3,189,914 | 6/1965 | Gusewitch | 351/160 |
| 3,597,055 | 8/1971 | Neefe | 351/168 |
| 4,231,905 | 11/1980 | Neefe | 523/106 |
| 4,304,895 | 12/1981 | Loshaek | 523/106 |
| 4,463,149 | 7/1984 | Ellis | 523/106 |
| 4,472,327 | 9/1984 | Neefe | 523/106 |
| 4,620,954 | 11/1986 | Singer | 523/108 |

*Primary Examiner*—Arthur P. Demers

[57] ABSTRACT

A method of making contact lens materials which are identifiable from similar contact lens materials. This is done by selecting a fluorescent colored soluble organic fluorescent dye in solid state solution in a transparent organic resin. The fluorescent color pigment is added in small amounts ranging from 0.0003 to 0.009 parts by weight of the lens monomer mixture. The lens monomer mixture containing the fluorescent dye is polymerized to form a solid contact blank. A contact lens is made from the solid polymerized blank containing the colored fluorescent dye. The contact lens convex surface is placed on a dark flat surface. In the absence of visible light the lens is irradiated with ultraviolet light. The colored fluorescent light emanating from the dye within the lens is concentrated at the lens edge by reflecting between the lens polished optical surfaces. The colored fluorescent light exits the lens at the edge. The lens material is identified by observing the color visible at the lens edge.

19 Claims, No Drawings

METHOD OF MAKING A CONTACT LENS MATERIAL WHICH MAY BE IDENTIFIED BY COLORED FLUORESCENCE

This is a continuation-in-part of application Ser. No. 857,177, filed Apr. 29, 1986, entitled: "A METHOD OF MAKING A CONTACT LENS MATERIAL WHICH MAY BE IDENTIFIED", now U.S. Pat. No. 4,632,773.

PRIOR ART

Fluorescent dots have been applied to the front of the lens to identify the lens. It is sometimes difficult for the practitioner to identify the right and left contact lens. Fluorescent dots are applied to the edge of the right lens to aid in right and left lens identification.

The use of fluorescent materials in the bifocal segments of contact lenses has been in use since 1970. Fluorescent material added to the bifocal segment makes the segment visible to the contact lens fitter. With the use of an ultraviolet light source to cause the bifocal reading segment to brightly fluoresce the position and fit of the bifocal reading segment may be evaluated. Charles W. Neefe, U.S. Pat. No. 3,597,055.

Fluorescent compounds in contact lenses aid to locate them in the dark. L. Gusewitch, U.S. Pat. No. 3,189,914, June 15, 1965.

An Article by Charles W. Neefe, "Circle of Condifence, Lens Identification", Contact Lens Forum, September 1981, describes lens fluorescence.

STATE OF THE ART

At this time many new and varied contact lens materials are becoming available to the practitioner and the necessity for material type identification becomes important. These new materials are alike in appearance and feel and may differ only in oxygen permeability or wetting angle. The practitioner has no method to readily identify the material. Counterfeiting and substitution of lens materials and misleading advertising has become common place. A method is needed for the practitioner and laboratories to identify lens materials for duplication purposes and to prevent receiving material other then those ordered.

THE LENS IDENTIFICATION FUNCTIONS AS FOLLOWS

A small amount of colored ultraviolet activated fluorescent material is evenly distributed throughout the lens. The fluorescence is of a low level and is not visible to the eye until the fluorescent light is concentrated at the lens edge. This concentration of fluorescent light can occur only when the lens is dry and off the eye. When emersed in tears having a refractive index of 1.49, no concentration of light will occur as the critical angle of refraction at the lens surface is too low. When the dry lens is in air having a refractive index of 1.0 the critical angle of refraction will be much higher and the fluorescent light will be totally reflected at the lens surface back into the lens. Polished optical surfaces above the critical angle act as mirrors and reflect light back into the lens structure. The critical angle is the angle of incidence beyond which refraction is impossible and the optical surface becomes a total reflecting surface. This phenomena makes fiber optics possible and is the principal upon which this invention functions. Polished surfaces such as prisms and fiber optics become almost perfect mirrors with little loss of light above the critical angle. The two lens surfaces act as a wave guide containing the fluorescent light between the lens surfaces and allowing the light to exit only at the lens edge. The fluorescent light eminating from within the lens in concentrated at the lens edge and is visible in a darkened room as a colored light at the periphery of the lens.

THE MATERIAL IS MADE AS FOLLOWS

To the mixture of the lens monomer the required transparent colorants are added, generally gray, blue, green and brown colorant are used in contact lenses.

EXAMPLES OF CONTACT LENS COLORANTS

FD and C Green #6, Leeben Color Blue LA-589, Brown LS-595, Green 16128 and Violet LS-611.

The acid dyes known as azo dyes containing nitrogen to nitrogen bonds —N=N— may be used to practice the invention as may the dyes known as reactive dyes and the sulphur dyes. The sulphur dyes are fixed or made fast by removing the sodium sulphide which made the dye soluble. Reactive dyes require no special fixing step, only extraction of unreacted dye as they react chemically with the material and are thus made permanent, The properties of the dyes are well known to the art.

Fluorescence is a process of photo-luminescence by which light of short wavelengths, either in the ultraviolet or the visible regions of the electromagnetic spectrum, is absorbed and reradiated at longer wavelengths. The remission occurs within the visible region of the spectrum and consequently is manifested as color.

FLUORESCENT PIGMENTS AND DYES

Fluorescent pigments are transparent organic resin particles containing dyes which are capable of fluorescing while in a solid state solution.

Certain substances, especially a number of organic dyes, have the property of fluorescing under untraviolet light. The fluorescence of these organic dyes is associated with the idividual dye molecules; and in order for them to fluoresce efficiently, they must be dissolved in fairly low concentrations in a solvent for the dyes. Due to the nature of the dyes used, it is necessary to have an organic medium or carrier to put them into solution. The type of material which meets these requirements for a carrier for the dyes is a transparent organic contact lens resin.

Fluorescent dyes are stable to indoor light or conditions of outdoor light other than direct sunlight.

It is possible to mix more than one fluorescent dye and a nonfluorescent colorant in the same formula.

To the liquid lens monomer mixture a small amount of a colored fluorescent dye material is added. These trace amounts of fluorescent dye materials do not alter the visible color of the lens. This mixture of monomer, transparent colorants, and fluorescent dyes are polymerized to produce lens blanks for the manufacture of contact lenses. The fluorescent dye colorants are secured in the polymer structure and will not leach from the material. The fluorescent colors are red, blue, green, gold, etc. The concentration of the fluorescent material is extremely low, ranging from 0.0003 to 0.009 parts by weight of lens monomer. In a darkened room the lens is placed concave side up and the convex surface on a dark flat surface and an ultraviolet lamp irradiates the lens. No fluorescence is visible in the central lens area, a ring of colored light is seen at the edge where the light eminating within the lens by fluorescence is concentrated.

THE HARD GAS PERMEABLE LENS MATERIAL IS MADE AS FOLLOWS

The permeable silane-methacrylate copolymer is made as follows; 100 millileter of a reactive monomer such as monomeric methylmethacrylate is placed in a holding flask. 2 to 150 millileter of a reactive organosilane such as Y-methacryloxypropyltrimethoxysilane ($Ch_2=COCH_3)CO_2(CH_2)_3Si(OCH_3)_3$) having a molecular weight of 196.3 is placed in a second vessel and heated to 80° C. and a catalyst such as benzoyl peroxide 0.50% by weight of the Y-methacryloxypropyltrimethoxysilane is slowly added. Stirring is continued until polymerization is noted by a slight increase in viscosity. The temperature is reduced to 50° C. and the silane is allowed to thicken to a syrup state. The polymerized silane syrup containing large molecules is slowly added to the monomeric methylmethacrylate monomer and 0.008 parts by weight of 2,2'-(2,5 Thiophenediyl)bis[5-tert-butylbenzoxazole] known as, Uvitex OB provided by Ciba Ceigy Co., thoroughly mixed. The mixture is purged of atmospheric oxygen and placed under a nitrogen blanket in a 55° C. water bath of 24 hours.

EXAMPLE II

A material is prepared by polymerizing 50 parts by weight of 1,1,1-tris(trimethylsiloxy)methacryloxypropysilane, 40 parats by weight of methylmethacrylate, 3.5 parts by weight of Bis(methacryloxypropyl)tetramethyldisiloxane and 6.5 parts by weight of beta-styrene sulfonate. 0.009 parts by weight 2,2'-(2,5-Thiophenediyl)bis[5-tert-butylbenzoxazole]. in the presence of 0.25 parts by total weight benzoyl peroxide. The mixture is placed in the mold and placed in a 70° C. water bath for 12 hours and post cured at 85° C. for 24 hours. Contact lenses are fabricated by lathe cutting the concave and convex surfaces. The lenses are edged by conventional techniques and are hard, transparent, highly oxygen permeable, and wettable.

EXAMPLE III

This examples demonsrates the polymerization of the siloxanyl alkyl ester 1,1,1-tris(trimethylsiloxy)-methacryloxypropylsiloxane and the oxygen permeable crosslinking agent Bis (3-glycidoxypropyl)tetramethyldisiloxane.

The material is prepared by polymerizing 45 parts by weight of 1,1,1-tris(trimethylsiloxy)methacryloxypropylsiloxane, 45 parts by weight of methylmethacrylate, 5 parts by weight of Bis(3-glycisocypropyl)tetramethylsisiloxane and 5 parts by weight of dimethylamionoethyl methacrylate 0.002 parts by weight in the presence of 0.25 parts by weight of benzoyl peroxide. The mixture is placed in the mold and placed in a 70° C. water bath for 12 hours, and post cured at 85° for 24 hours. Contact lenses are fabricated by lathe cutting and polishing the surfaces. Lenses are edged by conventional techniques and are hard, transparent, wettable and highly oxygen permeable.

A TYPICAL FORMULATION FOR THE FLUORESCENT COLOR YELLOW IS AS FOLLOWS

Methylmethacrylate monomer 96 parts by weight
Ethylene dimethacrylate 3.799 parts by weight
Salicyladehyde Azine Yellow 0.001 parts by weight
Benzoyl Peroxide .2 parts by weight The monomers are polymerized by heating to 45° C. for eight hours and post cured at 90° C. for ten hours and a contact lens is lathe cut and polished from the material. Other fluorescent materials may be used in combination to produce red, blue, pink, or orange colors to identify lens materials.

EXAMPLES OF INORGANIC FLUORESCENT PIGMENTS

Uvitex OB=Bright Blue Emission Peak 455 nm
Violet=ZnS:Ag Emission Peak 460 nm
Blue=ZnS:Ag Emission Peak 505 nm
Blue-Green=(Zn,Cd)s:Ag Emission Peak 485 nm
Green-Blue=(Zn,Cd)S:Ag Emission Peak 532 nm
Green=(Zn,Cd)S:Ag Emission Peak 560 nm
Green-Yellow (Zn,Cd)S:Ag Emission Peak 593 nm
Yellow=(Zn,Cd)S:Ag Emission Peak 625 nm
Orange=(Zn,Cd)S:Ag Emission Peak 660 nm
Yellow-Green=Sodium Fluorescein
Bright Red=Rose Benzol
Red=(Zn,Cd)S:Ag Emission Peak 675 nm
Dark Red=(Zn,Cd)S:Ag Emission Peak 695 nm
Purple=(Zn,Cd)S:Ag Emission Peak 576 nm
Flesh Color=ZnS:Mn Emission Peak 450/550/580
White=ZnS"Af+(Zn,Cd)S;Ag
White 101=(Zn,Cd)S:Ag,A,Ce
Red CS=$CaSiO_3$:Mn Emission Peak 620 nm
Green ZS=$Zn_2SiO_4$:Mn Emission Peak 529 nm
Yellow-Orange=ZnS:Mn Emission Peak 580 nm
L Blue=Terephthalic acid, 2,5-dihydroxydiethylester Emission peak 470 nm
L Yellow=Salicylaldehydeazine Emission Meak 543 nm
L White-Yellow=$C_{21}H_{16}N_2O_4S$ Emission Peak 545 nm Sources for colors useful to practice the invention are:
Leeben Color Chenical Co.
E. M. Chemicals
Sun Chemical Co.
Allied Chemical
Ciba Geigy
Day Glo Corp.
Colorcon, Inc.
American Hoechst
Fisher Scientific In this manner each material manufacturer by using a different color fluorescence can provide a positive identification for his conatct lens material. The practitioner may then know what lens material the patient is wearing and supply the correct duplicate lens in the event of loss.

Various modifications can be made without departing from the spirit of this invention or the scope of the appended calims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of making a contact lens material which is identifiable from similar contact lens materials by the step of selecting a colored fluorescent dye in solid state solution in a transparent organic resin adding the selected fluorescent colored dye in the amount of from 0.0002 to 0.009 parts by weight to the lens monomer mixture, polymerizing the lens monomer mixture to form a solid contact lens blank, making a contact lens from the solid contact lens blank, placing the contact lens convex surface on a dark surface, in the absence of visible light irradiating the lens with ultraviolet light, allowiong the colored fluorescent light emanating from within the lens to be concentrated at the lens edge by reflecting between the lens polished optical surfaces, allowing the colored fluorescent light to exit the lens at the lens edge, identifying the lens material by observing the selected color of the fluorescent colored light visible at the lens edge.

2. A method of making and identifying contact lens materials from another by the steps of selecting a fluorescent dye comprising an organic fluorescent colored dye in solid state solution in a transparent organic resin and fluoresces a specific visible color when irradiating with ultraviolet light, adding the selected colored fluorescent pigment in amounts of from 0.0002 to 0.009 parts by weight to the contact lens monomer mixture, polymerizing the monomer mixture to form a solid contact lens, irradiating the contact lens with invisible ultraviolet light in a darkened area, the colored fluorescent light emanating from within the lens is visible when concentrated at the lens edge by reflecting between the lens optical surfaces, identifying the contact lens material by observing the color of fluorescent light visible at the lens edge.

3. A method of making a contact lens material that can be identified from similar contact lens materials by the steps of adding the fluorescent inorganic dye 2,2'-(2,5-Thiophenediyl)bis[5-tert-butylbenzoxazole] to the liquid lens monomer, polymerizing the liquid lens monomer to form a solid contact lens blank, making a contact lens from the contact lens blank, in a dark area irradiating the lens with invisible ultraviolet light, allowing the fluorescent colored light emanating from the inorganic pigment within the lens to be concentrated by reflecting from the lens optical surfaces and made visible at the lens edge, identifying the contact lens material by observing the color of the fluorescnet light visible at the lens edge.

4. A method as in claim 1 wherein the color of the fluorescence is red.

5. A method as in claim 2 wherein the color of the fluorescence is red.

6. A method as in claim 3 wherein the color of the fluorescence is red.

7. A method as in claim 1 wherein the color of the fluorescence is blue.

8. A method as in claim 2 wherein the color of the fluorescence is blue.

9. A method as in claim 3 wherein the color of the fluorescence is blue.

10. A method as in claim 1 wherein the color of the fluorescence is yellow.

11. A method as in claim 2 wherein the color of the fluorescence is yellow.

12. A method as in claim 3 wherein the color of the fluorescence is yellow.

13. A method as in claim 1 wherein no fluorescence is visible in the central contact lens area.

14. A method as in claim 2 wherein no fluorescence is visible in the central contact lens area.

15. A method as in claim 3 wherein no fluorescence is visible in the central contact lens area.

16. A method as in claim 1 wherein nonfluorescent colorants are used in combination with fluorescent colorants.

17. A method as in claim 2 wherein nonfluorescent colorants are used in combination with fluorescent colorants.

18. A method as in claim 1 wherein the fluorescent colorant is 2,2'-(2,5-Thiophenediyl)bis[5-tert-butylbenzoxazole].

19. A method as in claim 2 wherein the fluorescent colorant is 2,2'-(2,5-Thiophenediyl)bis[5-tert-butylbenzoxazole].

* * * * *